United States Patent
Barker et al.

(10) Patent No.: US 11,245,739 B2
(45) Date of Patent: *Feb. 8, 2022

(54) DELIVERY OF CONTENT

(71) Applicant: Comcast Cable Communications, LLC, Philadelphia, PA (US)

(72) Inventors: Tom Barker, Chalfont, PA (US); Michael Chen, Wallingford, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/904,896

(22) Filed: Jun. 18, 2020

(65) Prior Publication Data

US 2020/0396272 A1  Dec. 17, 2020

Related U.S. Application Data

(63) Continuation of application No. 15/138,367, filed on Apr. 26, 2016, now Pat. No. 10,728,299, which is a
(Continued)

(51) Int. Cl.
*G06F 15/16* (2006.01)
*H04L 29/06* (2006.01)
(Continued)

(52) U.S. Cl.
CPC .......... *H04L 65/60* (2013.01); *H04L 43/0811* (2013.01); *H04L 67/22* (2013.01);
(Continued)

(58) Field of Classification Search
CPC ...................................................... H04L 65/60
(Continued)

(56) References Cited

U.S. PATENT DOCUMENTS 6,701,316 B1 *  3/2004  Li ....................... G06F 16/9574
                                                    370/395.41
6,959,320 B2 * 10/2005  Shah ........................ G06F 8/65
                                                    709/203

(Continued)

FOREIGN PATENT DOCUMENTS

| EP | 1954045 A1 | 8/2008 |
| WO | 2011146898 A2 | 11/2011 |

OTHER PUBLICATIONS

Download Accelerator Plus—Scheduler, DAP Help, <http://www.speedbit.com/dap-help/download-accelerator-scheduler/>, obtained from Internet Jan. 3, 2013, 2 pages.

(Continued)

*Primary Examiner* — Anthony Mejia
(74) *Attorney, Agent, or Firm* — Banner & Witcoff, Ltd.

(57) ABSTRACT

Future data connection quality may be predicted based on past data connection quality, and future requests for data may be predicted based on past requests. These predictions may be used to help decide whether, when, and/or how to deliver the data in a proactive manner. For example, according to some aspects described herein, a future data connection quality may be predicted based at least on historical data connection quality. It may be determined whether to pre-deliver at least a first portion of an item of content based at least on the predicted future data connection quality. If so, then the at least the portion of the item of content may be pre-delivered to the device and/or to another destination.

27 Claims, 7 Drawing Sheets

Related U.S. Application Data continuation of application No. 13/826,540, filed on Mar. 14, 2013, now Pat. No. 9,357,021.

(51) Int. Cl.
| | |
|---|---|
| *H04N 21/24* | (2011.01) |
| *H04N 21/25* | (2011.01) |
| *H04N 21/258* | (2011.01) |
| *H04N 21/262* | (2011.01) |
| *H04N 21/433* | (2011.01) |
| *H04N 21/472* | (2011.01) |
| *H04N 21/658* | (2011.01) |
| *H04L 29/08* | (2006.01) |
| *H04L 12/26* | (2006.01) |

(52) U.S. Cl.
CPC ..... *H04N 21/2402* (2013.01); *H04N 21/2408* (2013.01); *H04N 21/251* (2013.01); *H04N 21/25891* (2013.01); *H04N 21/26216* (2013.01); *H04N 21/4331* (2013.01); *H04N 21/47202* (2013.01); *H04N 21/6582* (2013.01)

(58) Field of Classification Search
USPC .......................................................... 709/219
See application file for complete search history.

(56) References Cited

U.S. PATENT DOCUMENTS

| | | | | |
|---|---|---|---|---|
| 7,006,820 | B1* | 2/2006 | Parker | H04M 3/247 455/414.1 |
| 7,181,758 | B1* | 2/2007 | Chan | H04N 7/17318 348/E7.071 |
| 7,284,033 | B2* | 10/2007 | Jhanji | G06Q 30/02 709/204 |
| 7,650,376 | B1* | 1/2010 | Blumenau | H04L 67/1023 709/203 |
| 8,166,509 | B2 | 4/2012 | Brooks et al. | |
| 8,180,385 | B2 | 5/2012 | Aaron et al. | |
| 8,181,206 | B2 | 5/2012 | Hasek | |
| 8,194,555 | B2 | 6/2012 | Morrill et al. | |
| 8,213,366 | B2 | 7/2012 | Kozisek et al. | |
| 8,266,269 | B2 | 9/2012 | Short et al. | |
| 8,274,905 | B2 | 9/2012 | Edwards et al. | |
| 8,290,132 | B2 | 10/2012 | Klemm | |
| 8,896,652 | B2 | 11/2014 | Ralston | |
| 8,977,681 | B2* | 3/2015 | Zhu | H04L 67/322 709/203 |
| 8,996,661 | B1* | 3/2015 | Kolam | H04L 67/06 709/219 |
| 8,996,719 | B2 | 3/2015 | Condon et al. | |
| 9,019,858 | B2 | 4/2015 | Harris et al. | |
| 9,060,208 | B2* | 6/2015 | Rieger | H04N 21/26241 |
| 9,137,125 | B1 | 9/2015 | Doronichev | H04L 12/189 |
| 9,336,178 | B2* | 5/2016 | Haas | H04L 67/289 |
| 9,357,021 | B2 | 5/2016 | Barker et al. | |
| 9,384,297 | B2* | 7/2016 | Graham | G06F 16/957 |
| 9,626,363 | B2* | 4/2017 | Rosenblatt | G06F 16/40 |
| 9,826,057 | B2* | 11/2017 | Agarwal | G06F 16/9535 |
| 10,091,322 | B2* | 10/2018 | O'Donoghue | G06F 9/4451 |
| 2003/0114138 | A1* | 6/2003 | Ramaswamy | H04L 67/2842 455/403 |
| 2003/0135631 | A1* | 7/2003 | Li | H04L 29/06027 709/231 |
| 2004/0034712 | A1* | 2/2004 | Rajwan | H04L 1/0083 709/231 |
| 2005/0227716 | A1 | 10/2005 | Tanaka et al. | |
| 2006/0075019 | A1* | 4/2006 | Donovan | H04L 67/306 709/203 |
| 2007/0002743 | A1* | 1/2007 | Fan | H04W 28/20 370/235 |
| 2008/0046584 | A1* | 2/2008 | Tucker | H04N 7/163 709/231 |
| 2008/0084896 | A1* | 4/2008 | Fleury | H04L 65/4084 370/468 |
| 2008/0177994 | A1* | 7/2008 | Mayer | G06F 9/4418 713/2 |
| 2008/0242280 | A1* | 10/2008 | Shapiro | H04N 21/41407 455/414.3 |
| 2009/0006599 | A1 | 1/2009 | Brownrigg, Jr. | |
| 2009/0031384 | A1 | 1/2009 | Brooks et al. | |
| 2009/0168752 | A1 | 7/2009 | Segel | |
| 2009/0281718 | A1* | 11/2009 | Gibran | G01C 21/3889 701/532 |
| 2009/0307368 | A1* | 12/2009 | Sriram | H04N 21/44004 709/231 |
| 2010/0146569 | A1 | 6/2010 | Janardhan et al. | |
| 2010/0205628 | A1* | 8/2010 | Davis | H04N 21/41265 725/25 |
| 2010/0325656 | A1 | 12/2010 | Hardacker et al. | |
| 2011/0296485 | A1 | 12/2011 | Nilsson et al. | |
| 2012/0144438 | A1 | 6/2012 | Sayeed | |
| 2012/0289147 | A1* | 11/2012 | Raleigh | H04N 21/6547 455/3.06 |
| 2012/0302218 | A1* | 11/2012 | Tsuda | H04W 8/18 455/414.1 |
| 2012/0320916 | A1* | 12/2012 | Sebastian | H04N 21/6375 370/390 |
| 2013/0080516 | A1 | 3/2013 | Bologh | |
| 2013/0097309 | A1* | 4/2013 | Ma | H04L 67/2847 709/224 |
| 2013/0163667 | A1* | 6/2013 | Nilsson | H04N 21/44004 375/240.12 |
| 2013/0225220 | A1 | 8/2013 | Dotzler et al. | |
| 2013/0254815 | A1 | 9/2013 | Pfeffer et al. | |
| 2013/0275685 | A1* | 10/2013 | Barbas | G06F 16/24552 711/137 |
| 2013/0332297 | A1* | 12/2013 | Forutanpour | G01C 21/3461 705/26.1 |
| 2014/0067257 | A1* | 3/2014 | Dave | H04W 4/40 701/423 |
| 2014/0082192 | A1 | 3/2014 | Wei | |
| 2014/0136653 | A1 | 5/2014 | Luby et al. | |
| 2014/0280485 | A1 | 9/2014 | A Hummaida et al. | |
| 2015/0006731 | A1* | 1/2015 | Ren | H04L 47/826 709/226 |
| 2015/0113156 | A1* | 4/2015 | Smith | H04L 65/605 709/231 |
| 2015/0120876 | A1* | 4/2015 | Parthasarathy | H04L 65/60 709/219 |

OTHER PUBLICATIONS

European Office Action—EP Appl. 14159707.0—dated Nov. 16, 2015.
Extended European Search Report—EP14159707.0—dated Jun. 13, 2014.
Javaid, "Schedule Firefox Downloads for Off-Peak Time [Extension]", Apr. 8, 2011, <http://www.additivetips.com/internet-tips/schedule-firefox-downloads-for-off-peak-time-e . . . >, 3 pages.
May 15, 2020—Canadian Office Action—CA 2,846,379.

* cited by examiner

DELIVERY OF CONTENT

CROSS-REFERENCE TO RELATED APPLICATIONS

This application is a continuation of U.S. application Ser. No. 15/138,367, filed Apr. 26, 2016, now U.S. Pat. No. 10,728,299, which is a continuation of U.S. application Ser. No. 13/826,540, filed Mar. 14, 2013, now U.S. Pat. No. 9,357,021, hereby incorporated by reference in their entirety for all purposes.

BACKGROUND

In a network environment, data may be delivered to a device in response to a request by the device. The data connection with the device may vary over time and under different conditions. For example, the network itself may experience problems such as overloading, noise, and broken connections, or the device may have difficulty obtaining reliable signal strength with the network. If the data connection happens to be poor during data delivery, then delivery may suffer. This may be especially problematic where the data is expected to be delivered in a consistent manner, such as when the data represents streamed multimedia content. Data connection problems are typically handled using a reactive process in which the data quality may be reduced or delayed until the data connection improves. This type of reactive handling may sometimes result in a poor end user experience. The foregoing and other shortcomings are address in this disclosure.

SUMMARY

The following summary is for illustrative purposes only, and is not intended to limit or constrain the detailed description.

In some aspects, rather than merely reacting to detected data delivery issues while they are occurring, it may be desirable to predict future data connection quality based on past data connection quality. Future requests for data may also be predicted based on past requests. These predictions may be used to help decide whether, when, and/or how to deliver the data in a proactive manner. For example, if it is predicted that a future request for data may occur when it is likely that data connection quality will be poor, it may be desirable to pre-deliver at least a portion of the data that is predicted to be requested. Or, where data is already being delivered, it may be desirable to pre-deliver a future portion of the data if it is predicted that the future portion will likely be sent during a time of poor data connection quality.

While some episodes of poor data connection quality may not always be predictable, it has been found that there are factors that can affect data connection quality that are predictable based on past data connection quality patterns. In one aspect, for example, if a network typically experiences high usage at particular times of day and/or particular days of the week, it may be predictable based on this experience that this pattern will likely continue in the future. Or, if the device to receive the data is a mobile device that is carried by the user, the user may have a certain routine (e.g., commuting to work in the morning, being at home in the evening, etc.) that results in a repeatable pattern of data connection quality.

According to some aspects as described herein, methods, apparatuses, and software may perform, for example, at least the following process. A future point in time may be determined prior to a request (by, e.g., a device) for an item of content. The future point in time may be determined based at least on information indicating a correlation between a past timeframe and data connection quality. Also prior to the request, at least a first portion of the item of content may be sent (e.g., to the device and/or to another destination) beginning at the determined future point in time.

According to further aspects as described herein, methods, apparatuses, and software may perform, for example, at least the following process. A future data connection quality may be predicted based at least on historical data connection quality. It may be determined whether to pre-deliver at least a first portion of an item of content to a device based at least on the predicted future data connection quality. If so, then at least the portion of the item of content may be pre-delivered (e.g., to the device and/or to another destination).

According to still further aspects as described herein, methods, apparatuses, and software may perform, for example, at least the following process. A data connection quality may be predicted based at least on historical data connection quality. It may be determined whether a current data connection quality is consistent with the predicted data connection quality. It may further be determined whether to send at least a portion of an item of content to a device using the predicted data connection quality if the current data connection quality is consistent with the predicted data connection quality. Or, if the current data connection quality is inconsistent with the predicted data connection quality, then it may be determined whether to send at least the portion of the item of content to the device using the current data connection quality. In some aspects, if it is determined that the at least the portion of the item of content should be sent, then the at least the portion of the item of content is sent (e.g., to the device and/or to another destination).

As noted above, this summary is merely a summary of some of the features described herein. It is not exhaustive, and it is not to be a limitation on the claims.

BRIEF DESCRIPTION OF THE DRAWINGS

These and other features, aspects, and advantages of the present disclosure will become better understood with regard to the following description, claims, and drawings. The present disclosure is illustrated by way of example, and not limited by, the accompanying figures in which like numerals indicate similar elements.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
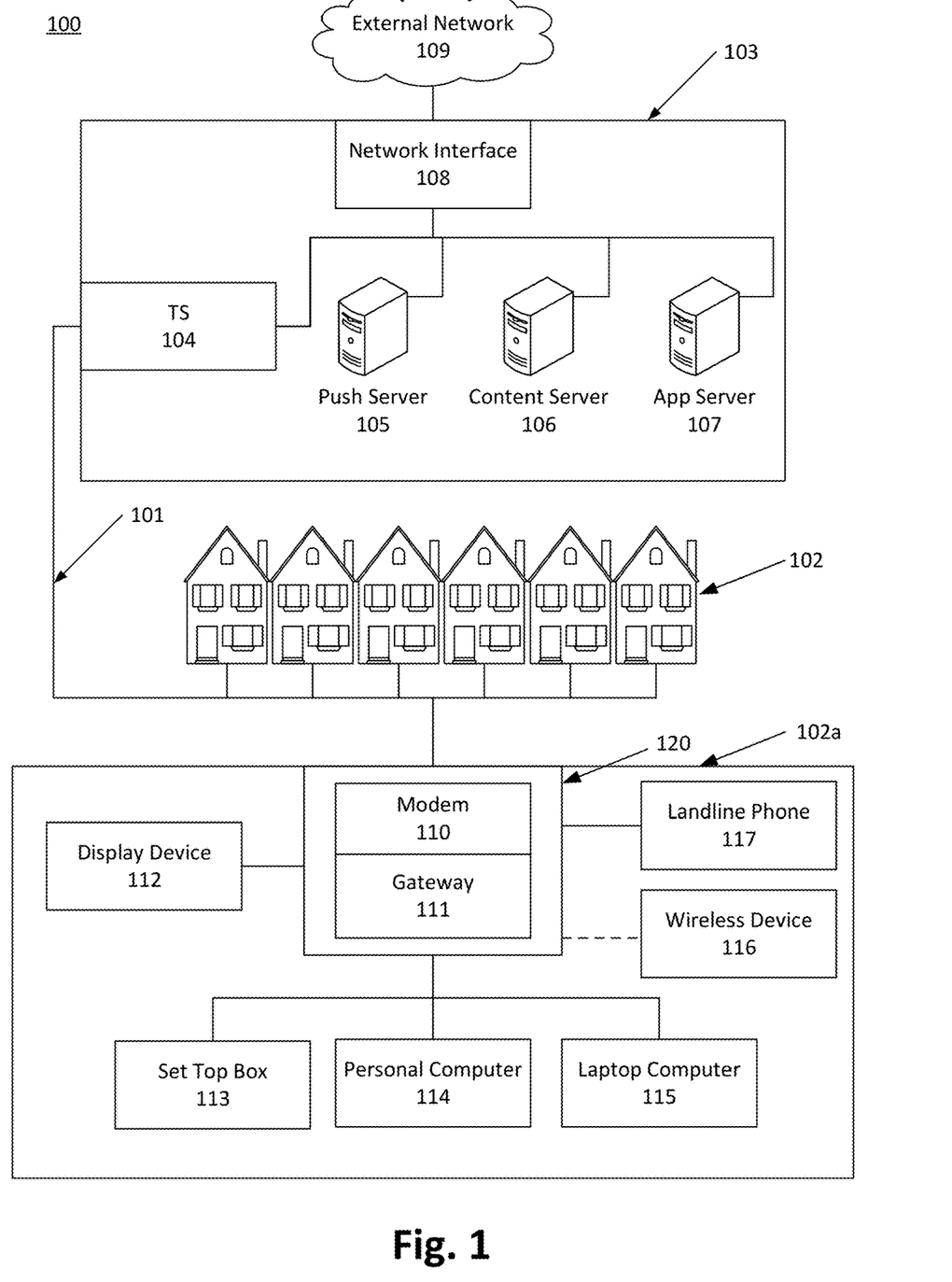
FIG. 1 illustrates an example communication network on which various features described herein may be used.

FIG. 1 illustrates an example communication network 100 on which many of the various features described herein may be implemented. Network 100 may be any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office (e.g., q data processing facility, a headend, etc.) 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. More specifically, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user(s) and/or device(s).

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Yet another application server may be responsible for formatting and inserting advertisements in a video stream being transmitted to the premises 102. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data.

An example premises 102a, such as a home, may include an interface 120. The interface 120 can include any communication circuitry needed to allow a device to communicate on one or more links 101 with other devices in the network. For example, the interface 120 may include a modem 110, which may include transmitters and receivers used to communicate on the links 101 and with the local office 103. The modem 110 may be, for example, a coaxial cable modem (for coaxial cable lines 101), a fiber interface node (for fiber optic lines 101), twisted-pair telephone modem, cellular telephone transceiver, satellite transceiver, local Wi-Fi router or access point, or any other desired modem device. Also, although only one modem is shown in FIG. 1, a plurality of modems operating in parallel may be implemented within the interface 120. Further, the interface 120 may include a gateway interface device 111. The modem 110 may be connected to, or be a part of, the gateway interface device 111. The gateway interface device 111 may be a computing device that communicates with the modem(s) 110 to allow one or more other devices in the premises 102a, to communicate with the local office 103 and other devices beyond the local office 103. The gateway 111 may be a set-top box (STB), digital video recorder (DVR), computer server, or any other desired computing device. The gateway 111 may also include (not shown) local network interfaces to provide communication signals to requesting entities/devices in the premises 102a, such as display devices 112 (e.g., televisions), additional STBs 113, personal computers 114, laptop computers 115, wireless devices 116 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 117 (e.g. Voice over Internet Protocol—VoIP phones), and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.15), analog twisted pair interfaces, Bluetooth interfaces, and others.

Figure 2:
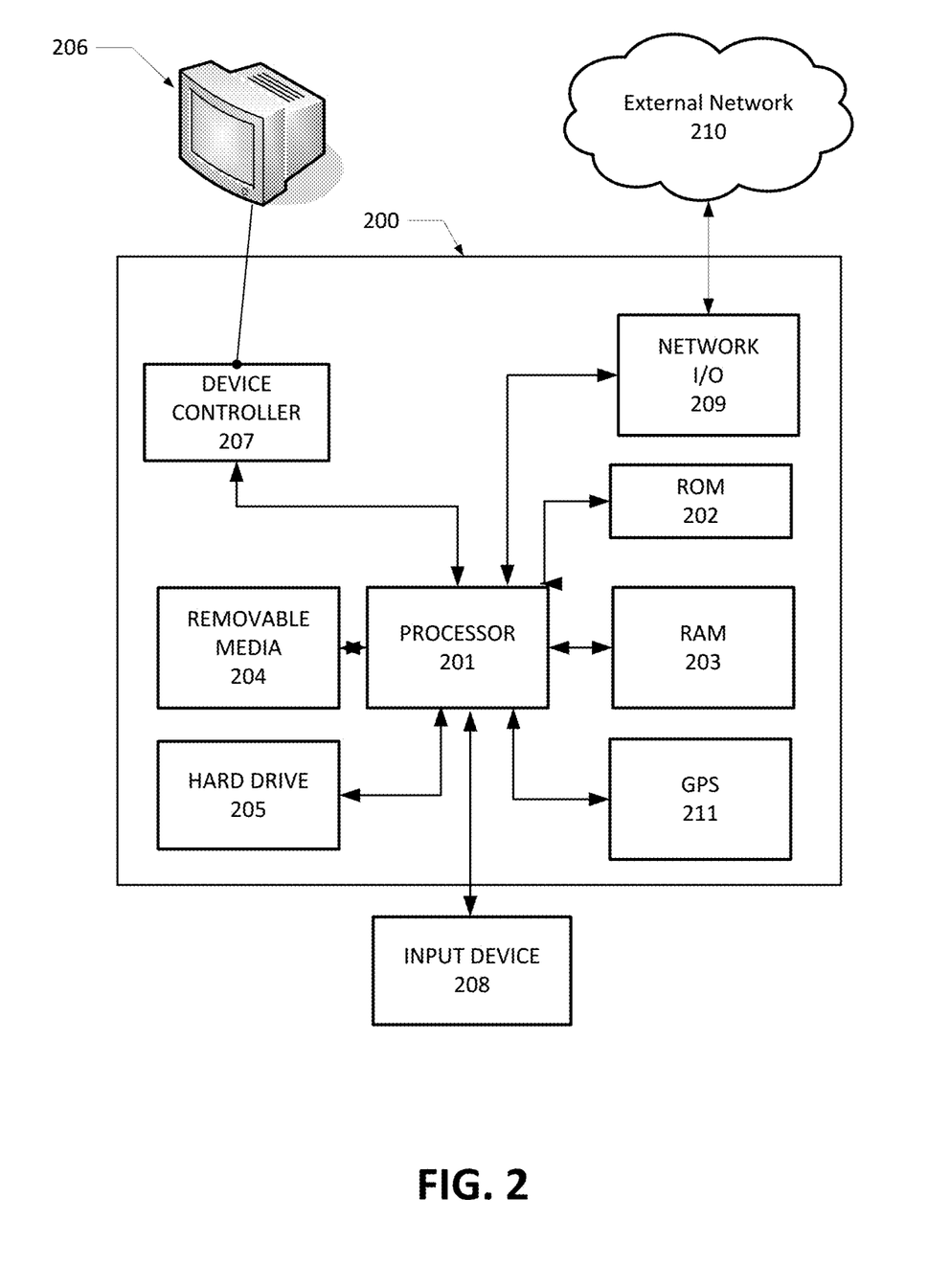
FIG. 2 illustrates an example computing device that can be used to implement any of the methods, servers, entities, and computing devices described herein.

FIG. 2 illustrates general hardware and/or software elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109, an in-home network, a provider's wireless, coaxial, fiber, or hybrid fiber/coaxial distribution system (e.g., a DOCSIS network), or any other desired network. Additionally, the device may include a location-detecting device, such as a global positioning system (GPS) microprocessor 211, which can be configured to receive and process global positioning signals and determine, with possible assistance from an external server and antenna, a geographic position of the device.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

As mentioned above, any of the devices 110-117 may be used for receiving and/or consuming content such as, but not limited to, audio content, video content (which may or may not also include audio content), image content, and/or other data. Any of the devices may be directly or indirectly in data communication with the local office 103, such as via the links 101 and/or through one or more other wired and/or wireless data connections. A given data connection may be subject to variable data connection quality over time. For instance, the available bandwidth through a data connection may be higher or lower at different times depending upon factors such as signal strength, noise, shared usage of the data connection, availability of one or more computing resources, and the like. A lower data connection quality may potentially result in, for example, lower data transfer speeds, higher data error rates, higher data transfer delays, and higher jitter. In general, the higher the data connection quality, the faster and/or more reliably may data be potentially transferred through the data connection. And, the lower the data connection quality, the more slowly and/or less reliably may data be potentially transferred through the data connection. However, this does not necessarily need to be the result of a higher or lower data connection quality.

Data connection quality may be measured in any of a variety of ways. For example, one or more characteristics experienced by a device using the data connection (e.g., a device receiving data over the data connection or a device sending data over the data connection) may determine data connection quality based on measured bandwidth, data rate, jitter, delay, and/or error rate.

As will be described herein, historical data connection quality may be used to predict future data connection quality. Knowledge of the predicted future data connection quality may be useful for, e.g., determining a particular start time and/or time window for sending data. For example, if data is to be sent to a receiving device over a data connection, then it may, in some instances, be desirable to send that data during a time in which is it predicted that the data connection is likely to experience a relatively higher data connection quality as compared with other times. To make such predictions, the system may obtain and store information about experienced data connection quality over a period of time. The stored information may be used to make predictions of what the data connection quality is likely to be like at a particular future time.

Figure 3:
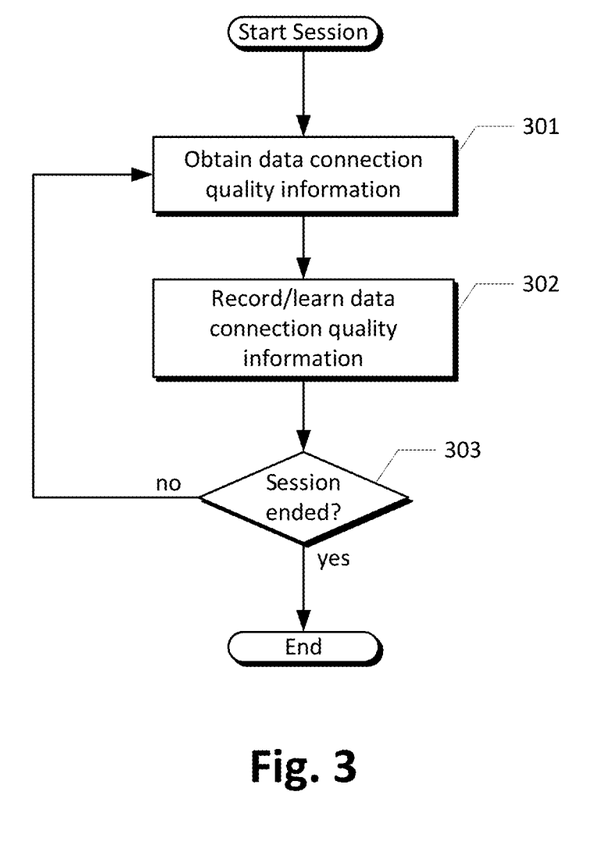
FIG. 3 is a flow chart showing example steps that may be performed in accordance with one or more aspects described herein.

FIG. 3 is a flow chart of an example method that may be performed in accordance with one or more aspects as described herein. The method includes steps that may be used for, e.g., obtaining and storing information about data connection quality experienced by one or more data connections. As mentioned above, the stored information may be used to make predictions about future data connection quality. The various steps in this flow chart may be partially or fully performed by one or more devices, such as by any of the elements of FIGS. 1 and 2. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

Figure 6:
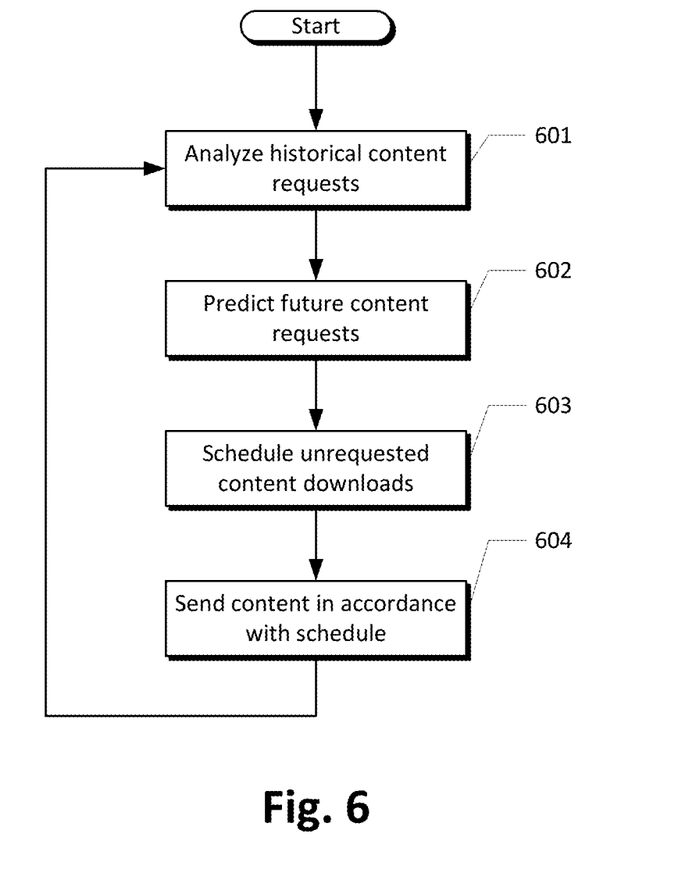
FIG. 6 is another flow chart showing example steps that may be performed in accordance with one or more aspects described herein.
Figure 7:
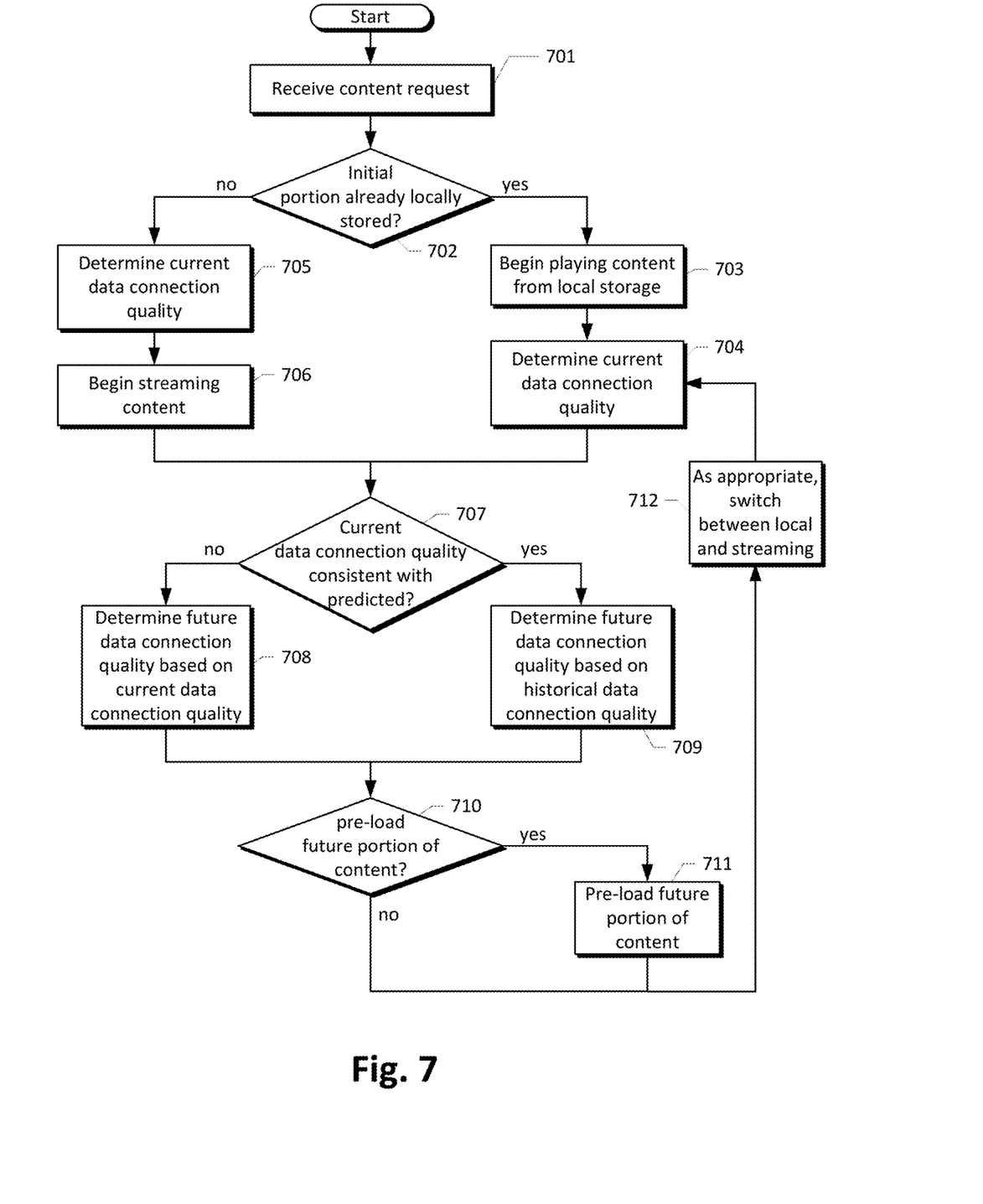
FIG. 7 is yet another flow chart showing example steps that may be performed in accordance with one or more aspects described herein.

The process of FIG. 3 may run concurrently with and/or independently from the processes of FIGS. 6 and 7. At step 301, after a data session has begun between a sending device and a receiving device (e.g., between a sending computing device such as content server 106 and a receiving computing device such as a user device e.g., laptop computer 115), data connection quality information may be obtained for a current time period. The time period may be a single point in time or it may be a time period having a non-zero length, such as one second, or one minute, etc. In the latter case, the determined data connection quality may be, for instance, the accumulated, average, and/or mean data connection quality measured over the time period. The data connection quality information may be obtained by, for instance, the sending device and/or the receiving device, and/or by any other device. The data connection quality information may include information about any one or more characteristics of the data connection quality, such as but not limited to bandwidth, data rate, jitter, delay, and/or error rate. The data connection quality information may be obtained for different networks, e.g., networks of different providers and/or different networks of the same provider. Each characteristic may be measured or otherwise determined, and may contribute to the overall data connection quality. The data connection quality information may include information about each characteristic and/or may include information that is a combination (e.g., hashing) of the characteristics. For example, the data connection quality could be a single value resulting from a combination of the various measured characteristics.

At step 302, the obtained data connection quality information may be stored in a computer-readable medium and/or otherwise learned for immediate and/or future use. For example, the data connection quality information may be stored at the application server 107 and/or at the laptop computer 115. Where the receiving device measures one or more aspects of the data connection quality and the information is to be stored at the sending side of a network, the receiving device may send information about the measured data connection quality to the sending side (e.g., to the sending device). The stored data connection quality information may also include or otherwise be associated with information about the context of the experienced data connection quality. For example, each measured or otherwise determined data point in the data connection quality information may be associated with the time of day at which the data connection quality is experienced, the identity (e.g., MAC address, IP address, serial number) of the receiving device, the software state of the receiving device (e.g., which Internet browser or media player software is being used to consume the data), the location of the receiving device (which may be measured by, for instance, GPS or cell tower triangulation), an identification of the data being sent (e.g., a particular item of content), an identification of the Internet service provider (ISP) and/or other service provider that may be used to provide connectivity between the sending device and the receiving device, an identification of the particular data connection being used to transfer the data, and/or an identification of a user account that is being used for the data transfer.

At step 303, it may be determined (e.g., by the sending or receiving device) whether the session has ended. If so, then the process ends for that session. If not, then the process may return to step 301 and may be repeated to collect additional data points of the data connection quality until the session ends. In other examples, there may not be a well-defined beginning or ending of a session, or there may be no particular session at all. In such a case, the data connection quality information may be collected intermittently (e.g., periodically) whenever the data connection is being used.

The collection of the historical data connection quality information may be used to make predictions about future data connection quality. The predictions may be made using, for example, computer learning algorithms that are well known, such as by analyzing the information to indicate one or more patterns in the data connection quality. For example, it may be determined using such analysis that every weekday between 5 pm and 6 pm, a particular data connection experiences an increasing data connection quality, and that the data connection quality is generally low between 4 pm and 5 pm on those days. Thus, it may be reasonable to expect that, on future weekdays, the same or a similar data connection quality pattern is likely to be experienced.

Figure 4A:
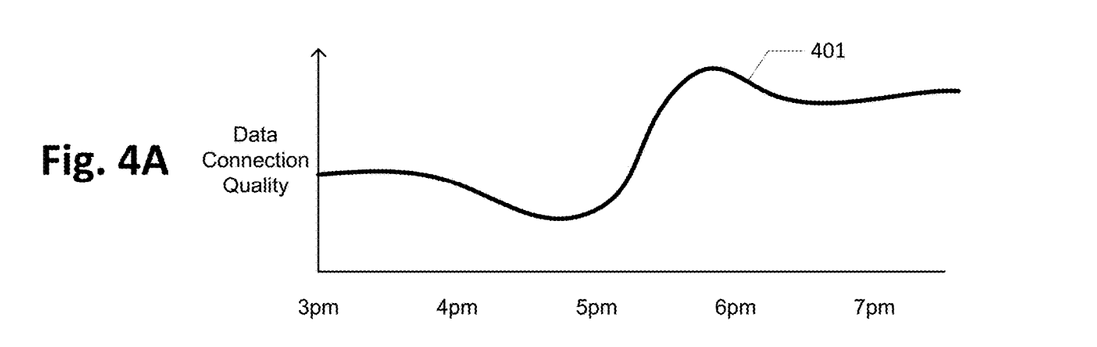
FIGS. 4A-4C are graphs showing examples of predicted data connection quality over time.

An example of such a predicted data connection quality over time is shown in the graph of FIG. 4A. In this graph, data connection quality is shown relative to time of day. While a single value is used to quantify data connection quality in this example, in other examples there may be multiple values/dimensions to data connection quality. For instance, there may be a first value for bandwidth, a second value for jitter, a third value for delay, and the like, all tracked over time. In some cases, a single value for data connection quality may be quantified based on a combination of multiple such aspects (e.g., a combination of bandwidth, jitter, delay, and/or any other aspects). In the present example of FIG. 4A, it will be assumed that the data connection quality shown in the graph is based at least on bandwidth predicted to be experienced by a data connection. In this example, a higher value of the data connection quality (upward in the graph) indicates a higher/better data connection quality.

As shown in the example of FIG. 4A, a curve 401 represents the value of the predicted data connection quality versus time of day. Thus, for instance, the data connection quality is predicted to be higher at 6 pm than at 5 pm. The predicted values may be determined based at least on the historical data connection quality information that may have already been collected during, e.g., the process of FIG. 3 or a similar process.

Figure 4B:
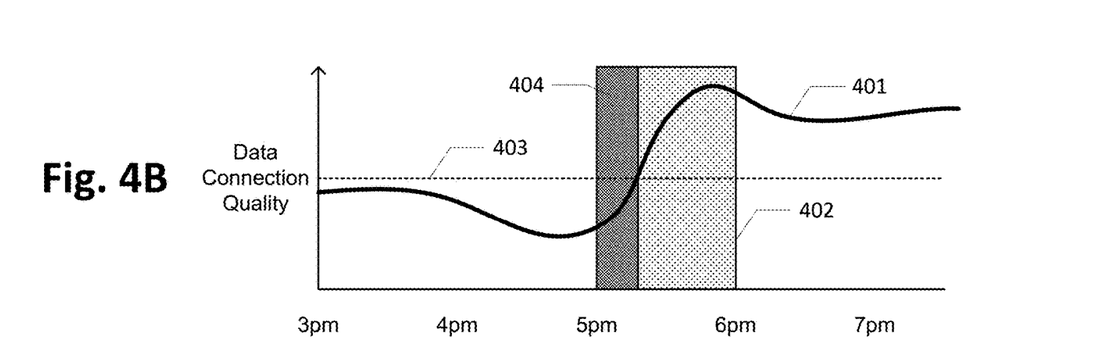

Referring to FIG. 4B, it is assumed that a particular set of data (e.g., a particular item of content) may be requested at 5 pm to be sent to, or otherwise available to, a receiving device. The requested item of content may include, for example, on-demand audio and/or video content, and may be expected to be consumed (e.g., displayed or recorded) in real time locally by the receiving device. In this example, the item of content, when consumed in real time, would last one hour (from 5 pm to 6 pm). The timing of the consumption of the content by the receiving device is illustrated in FIG. 4B by a shaded box 402 (extending from 5 pm to 6 pm). It is further noted that, in this example, it may be predicted that there may be insufficient data connection quality from 5 pm to about 5:15 pm, as indicated by a darker-shaded portion 404 of the shaded box 402. In this example, it may be determined whether the predicted data connection quality is insufficient by comparing the predicted data connection quality with a predetermined threshold value. If the predicted data connection quality is less than (or less than or equal to) the threshold value, then it may be determined that the predicted data connection quality is insufficient. If the predicted data connection quality is greater than (or greater than or equal to) the threshold value, then it may be determined that the predicted data connection quality is sufficient to send the requested data in a manner so as to be successfully consumed in real time.

One solution for addressing insufficient predicted data connection quality may be to reduce the quality of the data being sent. For example, where the requested data is an item of audio and/or video content, the audio and/or video may be reduced in quality (e.g., by reducing resolution and/or frame rate, and/or by increasing data compression). However, depending upon how low the data connection quality is, this may or may not be acceptable to the user of the receiving device.

Another solution may be to send at least a portion of the requested data before it is actually requested by the user. To accomplish this, it may be desirable to not only predict future data connection quality, but also to predict future requests for data (e.g., future requests for items of content such as on-demand audio and/or video content). This may be done by, for example, collecting information about past requests for data or other content, and using these past requests to make predictions of future requests. Thus, in the process of FIG. 3, for example, information about a request for content or other data for a given session (or even in a session-less environment) may be recorded along with the information about data connection quality. The request information may also be correlated with time. Like the historical data connection quality information, the set of data points of historical requests may also be correlated with other factors as mentioned above, such as the identity (e.g., MAC address, IP address, serial number) of the device from which the request is received and/or of the device receiving the requested content, the software state of the device (e.g., which Internet browser or media player software is being used to consume the data), the location of the requesting and/or receiving device (which may be measured by, for instance, GPS or cell tower triangulation), an identification of the data being sent (e.g., a particular item of content), an identification of the Internet service provider (ISP) and/or other service provider that may be used to provide connectivity between the sending device and the requesting and/or receiving device, an identification of the particular data connection being used to transfer the data, and/or an identification of a user account that is being used for the request and/or the data transfer.

Predictions of future requests may be made using, for example, computer-implemented learning algorithms. For example, if a particular user has typically requested an on-demand viewing of the most recent episode of a particular television series at or around 5 pm on Thursdays, then it may be predicted that the user will likely again request the most recent episode at approximately 5 pm on a future Thursday. Moreover, if the request is typically to view the episode on a particular device of the user, then it may further be predicted that the user will again request to view the episode in the future on that particular device.

By using both the historical data connection quality and request information, the system may be able to make predictions as to what is likely to be requested in the future and when it is likely to be requested, and correlate such predicted requests with predicted future data connection quality to determine how to appropriately deliver the requested content or other data. Referring again to the example of FIG. 4B, it is predicted that the user will request a one-hour long item of on-demand content at 5 pm (as indicated by box 402). It is further predicted that, from about 5 pm to about 5:15 pm, data connection quality may be relatively low, for instance, below a predetermined threshold value as indicated by line 403. In this example, because the data connection quality may be so poor for the first fifteen minutes of the content (when consumed in real time), it may be desirable to pre-deliver at least the first fifteen minutes (or other portion) of the content, even before a request for the content is made by the user.

Figure 4C:
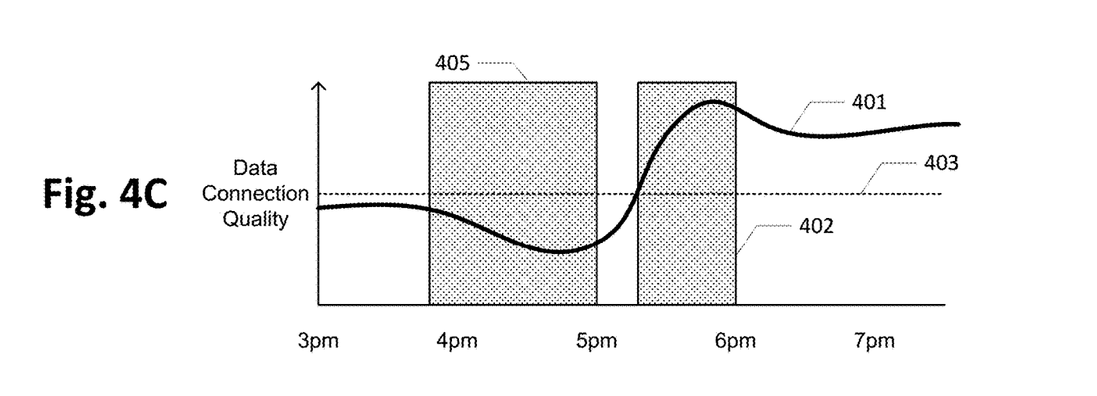

An example of such pre-delivery is shown in FIG. 4C. In this example, a portion of the content, indicated by box 405, is pre-delivered to the receiving device before a request for the content is received from the user or from the receiving device. Because the data connection quality may be relatively poor in this example during pre-delivery, the pre-delivered content portion 405 may take longer than it would take to consume the content in real time. In this way, a better quality version of the content portion 405 may be pre-delivered. Thus, in this example, although the content portion 405 represents the initial fifteen minutes of the content 402 when consumed in real time, the pre-delivery of the content portion 405 may take longer, such as about one hour in this example.

It can also be seen in FIG. 4C that the latter portion of the content 402 (in this example, beginning fifteen minutes of real-time consumption into the content 402), may not be delivered until it is needed in real time during consumption. Thus, a first portion of the content (portion 404/405) may be pre-delivered to the receiving device prior to a request for the content, and a second portion of the content (e.g., the remainder) may be sent to the receiving device in response to the content and when needed. In this example, since the receiving device may consume the initial portion 404/405 of the content from local data storage device of the receiving device, the remainder of the content 402 may be sent (e.g., streamed) to the receiving device only upon the locally-stored portion being fully consumed (or nearly so, such as consumed by at least a threshold amount such as 95% of the locally-stored content). When the threshold amount is consumed, then the receiving device may send a request upstream to the sending device to request further sending of the remaining content, such as by streaming.

In other examples, the first portion of the content (portion 404/405) may be pre-delivered to a destination other than the receiving device. For example, the first portion of the content may be pre-delivered to a server or other computing device associated with the receiving device, such as a media server on the same local network as the receiving device, or to some other local-area storage device such as a local-area storage device of a cellular network base station, etc. For instance, a particular user may take the 8:30 train into the city for work each weekday. While the train stations at either end may be covered by high-capacity operator WiFi, the uplinks from these train stations to larger core networks may be more constrained. Otherwise, the user's device may be reachable by, e.g., a cellular 3G/4G mobile data network. In this case, it may be desirable to pre-deliver (e.g., push and/or instruct the device to pull) content to the device and/or toward the device to another destination, depending upon what is desired, which means of connectivity is most available, and/or other factors. An example of such a destination other than the device may be a local-area storage device or system associated with the train station. Then, the local-area storage device or system may deliver the first portion of the content and/or any other portions of the content to (e.g., push to or make available to) the user device. In this example, by the network pre-delivering content toward, but not necessarily all the way to, the receiving device, this may allow conservation of the bandwidth of the more constrained uplinks and/or allow, e.g., full burst transfer while in range of the high-capacity WiFi. Thus, while various examples herein refer to sending or pre-delivering content to the receiving device, these examples may also be implemented such that the content is sent or pre-delivered to another destination. In these cases, the content may simultaneously and/or later be transferred from the other destination to the receiving device.

In the example of FIG. 4C, the initial portion 405 takes longer to pre-deliver than it would to consume in real time (e.g., one hour versus fifteen minutes). This is because, in this example, the data connection quality is lower than would be needed for real-time streaming of the content at the desired content quality level. However, in other examples, the data connection quality may be higher during pre-delivery such that the initial portion 405 of the content may be delivered at real-time consumption speed or even faster than real-time consumption speed. In fact, the system may schedule pre-delivery at a particular time to correspond to a desired level of data connection quality. For example, if the data connection quality in FIG. 4C is much higher from 1 pm to 2 pm (not shown in the graph), then pre-delivery may be scheduled to occur at a time between 1 pm and 2 pm to potentially reduce the relative amount of transfer time. The scheduled time of pre-delivery may also be determined based on other factors, such as availability of the receiving device, time-of-day cost for delivering data such as in accordance with an agreement with the user's ISP (e.g., certain peak times may be more expensive than others for data delivery), usage of the data connection, etc. In further examples, the sending of the initial portion 405 may at least partially overlap in time with (e.g., be sent at least partially concurrently with) the remainder of the item of content 402.

Figure 5A:
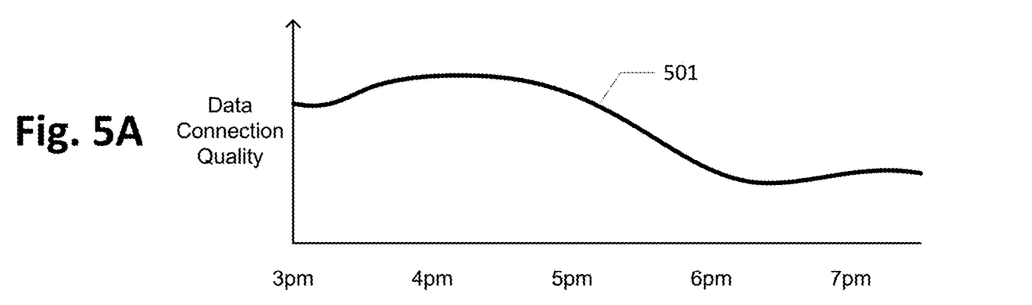
FIGS. 5A-5C are graphs showing further examples of predicted data connection quality over time.
Figure 5B:
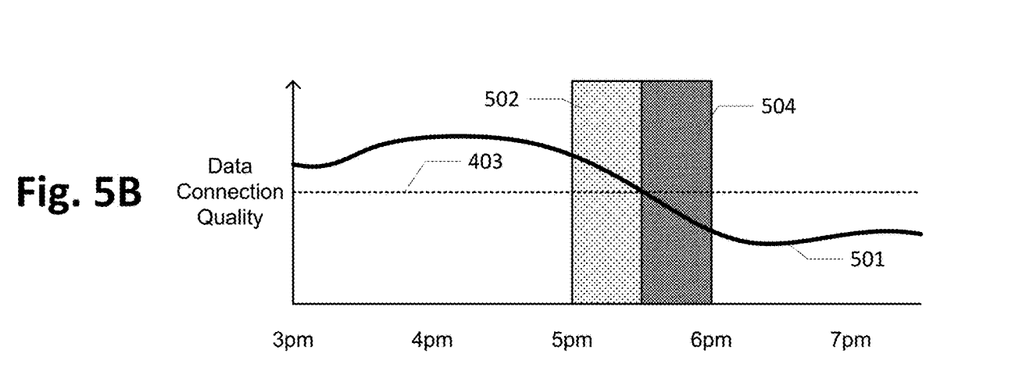

In the examples of FIGS. 4A-4C, an initial portion of content was pre-delivered before the content was requested. In further examples, it may be that a portion of content may be pre-delivered before it is to be consumed, however the pre-delivery may at least partially occur after the content is requested. For example, referring to FIG. 5A, the curve 501 represents an example of various values of predicted data connection quality over time. At FIG. 5B, it can be seen that an item of content 502 is requested and begins streaming to the receiving device at 5 pm. In this case, the predicted data connection quality is greater than the predetermined threshold 403 from about 5 pm to about 5:30 pm, and therefore it may be desirable to simply send in real time (e.g., stream) or faster the requested content beginning at 5 pm. At 5:30 pm, it is predicted in this example that the data connection quality is to drop below the predetermined threshold 403. Therefore, it is likely, based on the prediction, that a latter portion (represented by box 505) of the content, beginning at about 5:30 pm, is likely to be of degraded quality or even fail to send at all.

Figure 5C:
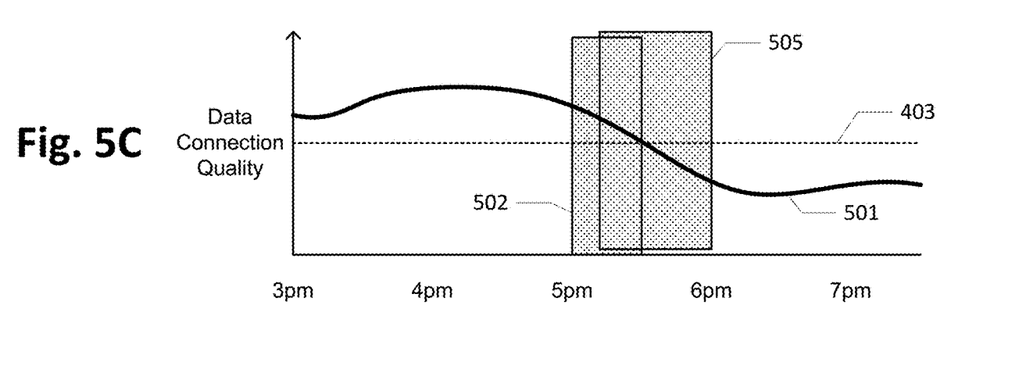

It may therefore be desirable to pre-deliver the latter portion of the content before it is to be consumed, and store the pre-delivered portion in local storage at the receiving device. This may be similar to pre-delivery as in FIG. 4C, except in the example of FIG. 5C, the pre-delivery may occur at least partially after the content is requested and/or after an initial portion of the content has begun being sent to (e.g., streamed to) the receiving device. This may also mean that the latter portion 505 may be sent at least partially simultaneously with the initial portion of the content. This is shown in FIG. 5C, in which the latter portion 505 of the content overlaps in time with the graph with the earlier portion of the content 502. To send the two portions of the content to the receiving device at least partially simultaneously, the two portions may be sent, for example, using different channels and/or streams. In this case, the receiving device may tune to both channels and/or streams simultaneously, and switch/transition between which portion of content to display to the user at the appropriate time. In some cases, the transition may be performed seamlessly such that the transition between the streamed content portion and the stored pre-delivered content portion may be smooth and/or undetectable by the human eye.

FIG. 6 is a flow chart of an example method that may be performed in accordance with one or more aspects as described herein. The method includes steps that may be used for, e.g., scheduling and/or otherwise initiating pre-delivery of as-yet unrequested content using predicted and/or measured data connection quality information. The various steps in this flow chart may be partially or fully performed by one or more devices, such as by any of the elements of FIGS. 1 and 2. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

The process of FIG. 6 may run concurrently with and/or independently from the processes of FIGS. 3 and 7. At step 601, the accumulated historical content requests for one or more users and/or receiving devices may be analyzed, such as for patterns. As discussed above, the analysis may be performed using, for example, a machine learning algorithm and/or using statistical analysis. For instance, Table 1 below shows an example of content request history for a particular user that may be stored and used for analysis. Such information may exist for each user and/or for each receiving device. From such a history, it may be determined, for instance, that a particular user and/or receiving device may historically request, on an on-demand basis, the most recent episode of an ongoing television series, and that the requests may be made, for example during a particular timeframe (e.g., particular time of day or window of time), and/or on particular days of the week. For instance, referring to Table 1, there may be a pattern where sequential episodes of a particular item of content, referred to herein generically as Content A, are requested at generally the same time of day on the same day of the week. The analysis of step 601 may be performed by, for example, the application server 107, the receiving device, (e.g., any of elements 110-117), and/or any other one or more computing devices.

TABLE 1

| Receiving Device | Timestamp | Content |
| --- | --- | --- |
| device 1 | 5/1/2000, 5:03:17pm | Content A, episode 4 |
| device 1 | 5/8/2000, 5:07:02pm | Content A, episode 5 |
| device 2 | 5/9/2000, 9:43:14am | Content B |
| device 1 | 5/10/2000, 9:13:48pm | Content C |
| device 3 | 5/12/2000, 11:35:16pm | Content D |
| device 1 | 5/15/2000, 4:59:28pm | Content A, episode 6 |

At step 602, using the outcome of the analysis of historical content requests, future content requests may be predicted. For example, where the particular user and/or receiving device historically requests, on an on-demand basis, the most recent episode of an ongoing television series, it may be predicted that this pattern of requests is likely to continue in the future. Referring to the example of Table 1, it may be predicted that it is likely, based on historical content request patterns, that the user will request, on May 22, 2000, at approximately 5 pm, that Content A, episode 7, be sent to device 1. While there is no guarantee that the prediction is correct, it may be determined to be a likely future request based on the historical requests. The prediction of step 602 may be performed for future predicted requests during a sliding future time window. The time window may or may not include the present time, and may be of a fixed or variable length of time. For example, the prediction of step 602 may be made for any predicted requests occurring within the next hour, or within the next four hours, or within the next day, or within the next week, or "this week," or "today." The start of the time window may be the present time (the time at which the prediction is being made) or it may start at a future time. For example, the time window may be "tomorrow" or "next week."

At step 603, for each of the predicted future content requests, it may be determined whether any pre-delivery of the requested content should be scheduled. To determine this, the predicted timeframe of when the content would be sent in response to the future request may be correlated with the predicted data connection quality at that timeframe. For example, it may be predicted that Content A, episode 7, will likely be requested at a 5 pm, and that the episode is scheduled to play for one hour. Therefore, the predicted likely potential timeframe for the content to be sent might be between 5 pm and 6 pm. This timeframe may be compared with the predicted data connection quality and determined whether there may likely be a problem with sending the content during that timeframe. For example, the predicted data connection quality during that timeframe may be compared with a predetermined threshold (e.g., the threshold 403). For any portions of the timeframe in which the predicted data connection quality is below (or equal to or below) the threshold, then it may be determined that at least that portion of the content likely to be playing at that time should be pre-delivered.

For example, referring again to FIG. 4B, it can be seen that the predicted data connection quality 401 is lower than the threshold 403 between 5 pm and 5:15 pm, but not for the remainder of the timeframe. Therefore, it may be determined that the portion of the content that would be predicted to be played between 5 pm and 5:15 pm may be pre-delivered, as shown by box 405 in FIG. 4C. Referring to the example of FIG. 5B, it can be seen that the predicted data connection quality 401 is lower than the threshold 403 between 5:30 pm and 6 pm, but not for the remainder of the timeframe. Therefore, it may be determined that the portion of the content that would be predicted to be played between 5:30 pm and 6:00 pm may be pre-delivered, as shown by box 505 in FIG. 5C. In the example of FIG. 5C, the pre-delivery is performed simultaneously with the streaming of the initial portion of the content 502. However, pre-delivery of the latter content portion 505 may be performed prior to any request for the content 502. It is also noted that pre-delivery may be performed for any one or more portions of an item of content, even a middle portion, and is not just limited to pre-delivery of a beginning portion and/or an end portion.

In addition to determining whether any item of content or portion thereof is to be pre-delivered prior to a predicted future request for the item of content, step 603 may also include determining how far in the future (e.g., determine a scheduled start time or timeframe) to pre-deliver the item of content or portion thereof. In general, the item of content or portion thereof may begin being pre-delivered (e.g., downloaded, streamed, or otherwise sent) to the receiving device an amount of time T before the predicted request for the item of content to be sent to the receiving device. The amount of time T may be determined in any of a variety of ways. For example, the value of T may be a predetermined fixed amount of time (e.g., one hour, or two hours, or twelve hours, or one day). Or, the value of T may depend at least upon the amount of data to be pre-delivered, where a larger amount of data may result in a larger value of T, and a smaller amount of data may result in a smaller value of T. In addition or alternatively, the value of T may depend at least upon the predicted future data connection quality at a timeframe prior to the predicted request for the item of content. For instance, if the predicted data connection quality is to be better (e.g., higher), then the value of T may be lower than if the predicted data connection quality is to be worse (e.g., lower). This is because a better data connection quality may be expected to allow for a higher data transfer rate (e.g., a higher available bandwidth) as compared with a worse data connection quality. For example, if the predicted data connection quality for the timeframe two hours before a predicted request is relatively poor, then T may be set to two hours (e.g., the pre-delivery may begin two hours before the predicted request for the item of content). If, on the other hand, the predicted data connection quality for that same two-hour timeframe is relatively good, then T may be set to a smaller value, such as one hour, before the predicted request for the item of content (e.g., the pre-delivery may begin one hour before the predicted request for the item of content). Another factor that may affect the value of T may include, for example, which other data is scheduled to be pre-delivered during the timeframe. If, for instance, several other items of content (or portions thereof) are already scheduled for pre-delivery to the receiving device and/or to other receiving devices in that same timeframe, then the pre-delivery of one or more of those items of content may be scheduled so as to not all occur at the same time and/or in an overlapping manner (thereby reducing the amount of bandwidth needed for pre-delivery).

At step 604, the content (or portion thereof) is pre-delivered to the appropriate one or more receiving devices at the scheduled time(s). The process of steps 601-604 may be repeated as often as desired, such as on a periodic (e.g., hourly, daily, or weekly) basis, and/or in response to updates to the historical data connection quality information and/or to the historical content request information.

FIG. 7 is a flow chart of an example method that may be performed in accordance with one or more aspects as described herein. The method includes steps that may be used for, e.g., providing content and/or other data to a receiving device. The various steps in this flow chart may be partially or fully performed by one or more devices, such as by any of the elements of FIGS. 1 and 2. While certain steps may be described below as being performed by a specific element, it will be understood that this is merely an example, and that each step may be performed by alternative elements. Moreover, while the steps are shown in a particular order and divided into specific steps, it will be understood that the order may be modified, and that one or more of the steps may be combined and that one or more of the steps may be further sub-divided into further steps.

The process of FIG. 7 may run concurrently with and/or independently from the processes of FIGS. 3 and 6, and may be triggered in response to a request for an item of content to be provided to a receiving device. Accordingly, at step 701, a device in the network (for example, the application server 107) may receive a request by the receiving device, through the network, for an item of content to be consumed (e.g., displayed, downloaded, and/or recorded) on demand. The request may involve, for example, sending a data message upstream through the network by the receiving device and/or by another device. In other examples, the request may be transmitted through a different network than the network over which the item of content is to be sent to the receiving device.

At step 702, the receiving device and/or the application server 107 (for example) may determine whether an initial portion (e.g., a portion that includes the beginning of the requested item of content, such as the portion indicated in FIG. 4C by block 405) is already locally stored at the receiving device. In other words, it is determined whether the initial portion has already been pre-delivered prior to the request. As discussed above, pre-delivery may occur based on a prediction that the request is going to occur.

If the initial portion is already locally stored, then the process may move to step 703, and the pre-delivered initial portion of the requested content may begin playing (e.g., being displayed to the user of the receiving device) from the local storage of the receiving device. At step 704, the receiving device, the application server 107, and/or another device may also determine (e.g., measure) the actual data connection quality currently experienced by the receiving device, and this information may be shared with, e.g., the application server 107 and/or the receiving device as appropriate.

If the initial portion is not already locally stored, then at step 705, the actual data connection quality currently experienced by the receiving device may be determined (e.g., measured), such as by the application server 107, the receiving device, and/or another device. Again, this data connection quality information may be shared as appropriate. At step 706, the requested item of content may begin being sent (e.g., streamed) downstream over the network to the receiving device. The content being sent at step 706 may be formatted in a manner appropriate for the current data connection quality. For instance, if the current data connection quality is relatively poor, then the content may be provided at a relatively low quality, such as at a low bit rate, low frame rate, and/or using high data compression, etc. On the other hand, if the current data connection quality is relatively good, then the content may be provided at a relatively higher quality, such as at a higher bit rate, higher frame rate, and/or using less data compression, etc.

Both branches of the process from steps 704 and 706 may then move to step 707, in which the receiving device, the application server 107, and/or another device may determine whether the actual current data connection quality (as determined at step 705 or step 703) is consistent with the predicted data connection quality for the current timeframe. Consistency between the predicted and actual values may be evaluated in any of a variety of ways. For example, it may be determined that the two values (predicted and actual) are consistent with each other if they are within a predetermined threshold difference (e.g., absolute difference or percentage difference) from each other. For example, if the two values are within 5% of each other, or within 10% of each other, or within 25% of each other, then the two values may be consider consistent, meaning that the predicted data connection quality turned out to be sufficiently accurate. If the two values are inconsistent, then this may mean that the predicted data connection quality turned out to be relatively inaccurate.

If the current (e.g., measured) actual data connection quality is consistent with the predicted data connection quality, then the process may move to step 709, in which predicted data connection quality (based on the historical data connection quality values collected in steps 301 and 302) may continue to be used for predicting whether future pre-loading of any portion of the item of content is appropriate. However, if the current (e.g., measured) actual data connection quality is inconsistent with the predicted data connection quality, then the process may move to step 708, in which predicted data connection quality may be considered unreliable at this time, and so the actual current data connection quality may be used for predicting whether future pre-loading of any portion of the item of content is appropriate during content playback. In the above example, only the predicted values (based on historical data connection quality values) may be used (step 709), or only the current measured data connection quality may be used (step 708), depending upon the consistency between the two values. However, in other examples, a combination of the two (prediction based on historical values, and current actual value) may be used to predict the future data connection quality during the remainder of the content playback.

Both branches of the process at steps 708 and 709 may then move to step 710, in which the receiving device, the application server 107, and/or another device may determine, based on the prediction as made in step 708 or step 709, whether to pre-load any upcoming portion of the item of content. For example, if it is predicted that the data connection quality will be relatively poor (e.g., lower than a predetermined threshold value), then it may be determined that pre-loading is appropriate. If it is predicted that the data connection quality will be relatively good (e.g., higher than a predetermined threshold value), then it may be determined that pre-loading is not appropriate. If the determination is that pre-loading is appropriate, then such pre-loading is performed in step 711. Otherwise, step 711 is skipped. An example of such pre-loading of an upcoming portion of content, while the content is currently being played back, is shown in FIG. 5C, in which the pre-loaded upcoming portion is represented by block 505. As previously discussed, the pre-loading of the upcoming portion of the content may be performed concurrently with the sending (e.g., streaming) of the currently-played-back content (represented by block 502). The pre-loading of the upcoming portion of the content may be sent to the receiving device on, for instance, a separate channel and/or separate stream from the channel and/or stream containing the currently-played-back content.

The process may then move to step 712, in which the receiving device, the application server 107, and/or another device may determine whether it is appropriate to switch the playback of the content (e.g., the displayed content) between the locally-stored pre-loaded version and the live-sent (e.g., streamed) version. For instance, if the locally-stored pre-loaded portion is currently being displayed to the user (as may be initiated, for example, at step 703), and if that locally-stored portion is ending, then the display of content may switch over to displaying the live-streamed version of the content. This switching may be done in a seamless manner (e.g., undetectable to the human senses), if desired. Or, for instance, if the live-streamed content is currently being displayed to the user (as may be initiated, for example, at step 706), and if there exists a locally-stored portion that begins at a current playback point in the streamed content, then the display of content may switch over to displaying the locally-stored version of the content. Again, this switch over may be seamless if desired.

The process may then move back to step 704 to again determine (e.g., measure) the current data connection quality, and the process may repeat as many times as desired. For instance, the process may repeat until the item of content ends or is otherwise terminated. In that case, the process of FIG. 7 may end and may begin again upon another request for content being initiated at step 701.

Although example embodiments are described above, the various features and steps may be combined, divided, omitted, and/or augmented in any desired manner, depending on the specific outcome and/or application. Various alterations, modifications, and improvements will readily occur to those skilled in art. Such alterations, modifications, and improvements as are made obvious by this disclosure are intended to be part of this description though not expressly stated herein, and are intended to be within the spirit and scope of the disclosure. Accordingly, the foregoing description is by way of example only, and not limiting. This patent is limited only as defined in the following claims and equivalents thereto.

The invention claimed is:

1. A method comprising:
   determining, by one or more computing devices, a predicted time of output of a content item;
   determining, based on historical data connection quality, a data connection quality related to the predicted time of the output;
   determining, based on the determined data connection quality failing to satisfy a threshold associated with consumption of the content item and on the predicted time of the output, a time, before the predicted time, for sending a portion of the content item; and
   causing the portion of the content item to be sent, via a network and at the determined time for sending the portion, to a computing device associated with a user.

2. The method of claim 1, wherein the determining the predicted time comprises:
   determining, as the predicted time of the output, a time at which the computing device associated with the user is expected to request the content item.

3. The method of claim 1,
   wherein the method further comprises:
   receiving, before the predicted time and after the determined time for sending the portion of the content item, a request for the content item; and
   causing, based on receiving the request, a second portion of the content item to be sent via the network to the computing device associated with the user.

4. The method of claim 1,
   wherein the determining the predicted time comprises:
   determining, as the predicted time of the output, a time at which a second computing device is expected to request the content item, and
   wherein the method further comprises:
   receiving, before the predicted time and after the determined time for sending the portion of the content item, a request for the content item; and
   causing, based on receiving the request for the content item, a second portion of the content item to be sent, via the second computing device, to the computing device associated with the user.

5. The method of claim 1, further comprising:
   causing a second portion of the content item to be sent, at least partially simultaneously with the portion of the content item, to the computing device associated with the user.

6. The method of claim 1,
   wherein the method further comprises:
   causing, based on receiving a request for the content item, a second portion of the content item to be sent to the computing device associated with the user, and
   wherein an interval of sending the portion of the content item at least partially overlaps an interval of sending the second portion of the content item.

7. The method of claim 1, wherein the determining the time, before the predicted time, for sending the portion of the content item comprises:
   determining the time, before the predicted time, further based on a comparison between the determined data connection quality and a current data connection quality.

8. The method of claim 1, wherein causing the portion of the content item to be sent comprises:
   pre-delivering the portion of the content item to the computing device associated with the user prior to the predicted time of the output.

9. The method of claim 1, wherein causing the portion of the content item to be sent comprises:
   outputting an instruction to send, at the determined time for sending the portion of the content item, via a network, and to the computing device associated with the user, the portion of the content item.

10. The method of claim 1, wherein causing the portion of the content item to be sent comprises:
    sending, at the determined time for sending the portion of the content item, via a network, and to the computing device associated with the user, the portion of the content item.

11. The method of claim 1,
    wherein the determining the predicted time comprises:
    determining, as the predicted time of the output, a time at which the computing device, associated with the user, is expected to request the content item, and
    wherein the method further comprises:
    receiving, before the predicted time and after the determined time for sending the portion of the content item, a request for the content item; and
    causing, based on receiving the request for the content item, a second portion of the content item to be sent, via a second computing device, to the computing device associated with the user.

12. A system comprising:
    a network interface; and
    one or more computing devices, wherein the one or more computing devices are configured to:
    determine a predicted time of output of a content item;
    determine, based on historical data connection quality, a data connection quality related to the predicted time of the output of the content item;

determine, based on the determined data connection quality failing to satisfy a threshold associated with consumption of the content item and on the predicted time of the output, a time, before the predicted time, for sending a portion of the content item; and cause the portion of the content item to be sent, at the time, before the predicted time, and via the network interface, to a computing device associated with a user.

13. The system of claim 12,
wherein the one or more computing devices are further configured to determine the predicted time by determining, as the predicted time, a time at which the computing device associated with the user is expected to request the content item.

14. The system of claim 12,
wherein the one or more computing devices are further configured to receive, before the predicted time and after the determined time for sending the portion of the content item, a request for the content item, and
wherein the one or more computing devices are further configured to cause, based on receipt of the request, a second portion of the content item to be sent, via the network interface, to the computing device associated with the user.

15. The system of claim 12,
wherein the one or more computing devices are further configured to determine the predicted time by determining, as the predicted time of the output, a time at which a second computing device is expected to request the content item, and
wherein the one or more computing devices are further configured to cause, based on a receipt of the request for the content item, received before the predicted time and after the determined time for sending the portion of the content item, a second portion of the content item to be sent, via the second computing device, to the computing device associated with the user.

16. The system of claim 12,
wherein the one or more computing devices are further configured to determine the predicted time by determining, as the predicted time of the output, a time at which the computing device, associated with the user, is expected to request the content item, and
wherein the one or more computing devices are further configured to cause, based on a receipt of the request for the content item, received before the predicted time and after the determined time for sending the portion of the content item, a second portion of the content item to be sent, via a second computing device, to the computing device associated with the user.

17. The system of claim 12, wherein the one or more computing devices are further configured to cause a second portion of the content item to be sent to the computing device associated with the user at least partially simultaneously with the portion of the content item.

18. The system of claim 12,
wherein the one or more computing devices are further configured to cause, based on receipt of a request for the content item, a second portion of the content item to be sent.

19. The system of claim 12, wherein the one or more computing devices are configured to determine the time, before the predicted time, by determining, further based on a comparison between the determined data connection quality and a current data connection quality, the determined time for sending the portion of the content item.

20. The system of claim 12, wherein the one or more computing devices are configured to cause the portion of the content item to be sent, prior to the predicted time of the output, by pre-delivering, separate from a sending of a second portion of the content item, the portion of the content item to the computing device associated with the user.

21. The system of claim 12, wherein the one or more computing devices are further configured to cause the portion of the content item to be sent by outputting an instruction to send, at the determined time for sending the portion of the content item, via the network interface, and to the computing device associated with the user, the portion of the content item.

22. The system of claim 12, wherein the one or more computing devices are further configured to cause the portion of the content item to be sent by sending, at the determined time for sending the portion of the content item, via the network interface, to the computing device associated with the user, the portion of the content item.

23. A method comprising:
sending, by a computing device associated with a user, a request for a content item; and
receiving, by the computing device and via a network, a portion of the content item at a time based on a data connection quality, related to a time when the computing device was predicted to receive the content item, failing to satisfy a threshold associated with consumption of the content item,
wherein the data connection quality is based on historical data connection quality.

24. The method of claim 23, wherein the sending the request is performed prior to the receiving the portion of the content item.

25. The method of claim 23, wherein the sending the request is performed after the receiving the portion of the content item.

26. The method of claim 23, further comprising:
receiving, by the computing device, a second portion of the content item at least partially simultaneously with the portion of the content item.

27. The method of claim 23, further comprising:
receiving, by the computing device, prior to the sending of the request for the content item, a second portion of the content item.

* * * * *

UNITED STATES PATENT AND TRADEMARK OFFICE
CERTIFICATE OF CORRECTION

| | |
|---|---|
| PATENT NO. | : 11,245,739 B2 |
| APPLICATION NO. | : 16/904896 |
| DATED | : February 8, 2022 |
| INVENTOR(S) | : Tom Barker and Michael Chen |

It is certified that error appears in the above-identified patent and that said Letters Patent is hereby corrected as shown below:

In the Specification

Detailed Description, Column 4, Line 16:
Please delete "HTMLS," and insert --HTML5,--

Signed and Sealed this
Twentieth Day of June, 2023

Katherine Kelly Vidal
*Director of the United States Patent and Trademark Office*